(12) United States Patent
Brand

(10) Patent No.: US 10,642,798 B2
(45) Date of Patent: *May 5, 2020

(54) METHOD AND SYSTEM FOR ROUTING DATA FLOWS IN A CLOUD STORAGE SYSTEM

(71) Applicant: CTERA Networks, Ltd., Petach-Tikva (IL)

(72) Inventor: Aron Brand, Petach-Tikva (IL)

(73) Assignee: CTERA Networks, Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/040,962

(22) Filed: Jul. 20, 2018

(65) Prior Publication Data

US 2018/0329922 A1 Nov. 15, 2018

Related U.S. Application Data

(63) Continuation of application No. 14/834,984, filed on Aug. 25, 2015, now Pat. No. 10,095,704.

(Continued)

(51) Int. Cl.
*G06F 16/178* (2019.01)
*H04L 29/08* (2006.01)
(Continued)

(52) U.S. Cl.
CPC .......... *G06F 16/178* (2019.01); *G06F 16/192* (2019.01); *G06F 16/955* (2019.01);
(Continued)

(58) Field of Classification Search
None
See application file for complete search history.

(56) References Cited

U.S. PATENT DOCUMENTS

| 6,868,452 B1 | 3/2005 | Eager et al. |
| 7,562,110 B2 | 7/2009 | Miloushev et al. |

(Continued)

FOREIGN PATENT DOCUMENTS

| CN | 103338242 A | 10/2013 |
| CN | 103763363 A | 4/2014 |

OTHER PUBLICATIONS

Patent Cooperation Treaty the International Search Report and the Written Opinion for PCT/US2015/046711, ISA/RU, Moscow, Russia, dated Jan. 28, 2016.

(Continued)

*Primary Examiner* — Davoud A Zand
(74) *Attorney, Agent, or Firm* — M&B IP Analysts, LLC

(57) ABSTRACT

A distributed storage system for allowing an access to a plurality of cloud storage systems is provided. The system includes a plurality of cloud storage systems (CSSs); and a plurality of computing devices, wherein the plurality of computing devices are in close proximity to each other and are geographically remote from each of the plurality of CSSs, wherein each computing device is configured to: dynamically select a best route between a CSS of the plurality of CSSs and the computing device; and establish, based on the selected best route, a data flow between the CSS and the computing device wherein the data flow is established to allow at least a storage service related to the CSS.

9 Claims, 16 Drawing Sheets

Related U.S. Application Data

(60) Provisional application No. 62/041,941, filed on Aug. 26, 2014.

(51) Int. Cl.

| | | |
|---|---|---|
| *H04W 4/60* | (2018.01) | |
| *G06F 16/188* | (2019.01) | |
| *G06F 16/955* | (2019.01) | |
| *H04L 12/24* | (2006.01) | |
| *H04L 12/721* | (2013.01) | |

(52) U.S. Cl.
CPC ............ *H04L 41/12* (2013.01); *H04L 45/124* (2013.01); *H04L 67/1097* (2013.01); *H04W 4/60* (2018.02)

(56) References Cited

U.S. PATENT DOCUMENTS

| | | | |
|---|---|---|---|
| 7,890,529 B1 | 2/2011 | Srinivasan et al. | |
| 8,112,505 B1 | 2/2012 | Ben-Shaul et al. | |
| 8,442,940 B1 | 5/2013 | Faletti et al. | |
| 8,781,105 B1 | 7/2014 | Duva et al. | |
| 8,849,950 B2 | 9/2014 | Stockhammer et al. | |
| 8,856,073 B2 | 10/2014 | Matsuzawa | |
| 9,015,564 B2 | 4/2015 | Luby et al. | |
| 9,282,169 B1 | 3/2016 | Chang | |
| 9,584,584 B2 | 2/2017 | Thakkar et al. | |
| 9,641,643 B2 | 5/2017 | Mohaban et al. | |
| 9,727,578 B2 | 8/2017 | Eshel et al. | |
| 9,769,258 B1 | 9/2017 | Kay | |
| 9,805,056 B2 | 10/2017 | Parkison et al. | |
| 2003/0187860 A1 | 10/2003 | Holland | |
| 2006/0268712 A1 | 11/2006 | Deen et al. | |
| 2007/0016621 A1 | 1/2007 | Havewala et al. | |
| 2008/0022005 A1 | 1/2008 | Wu et al. | |
| 2008/0109448 A1 | 5/2008 | Aboel-Nil et al. | |
| 2009/0016344 A1 | 1/2009 | Hu et al. | |
| 2009/0240705 A1 | 9/2009 | Miloushev et al. | |
| 2009/0254572 A1* | 10/2009 | Redlich .................. | G06Q 10/06 |
| 2010/0010968 A1 | 1/2010 | Redlich et al. | |
| 2010/0023788 A1 | 1/2010 | Scott et al. | |
| 2010/0250497 A1* | 9/2010 | Redlich .................. | F41H 13/00 |
| | | | 707/661 |
| 2010/0250508 A1 | 9/2010 | Erofeev | |
| 2011/0082945 A1 | 4/2011 | Myers et al. | |
| 2011/0191445 A1 | 8/2011 | Dazzi | |
| 2011/0231781 A1 | 9/2011 | Betzler et al. | |
| 2011/0258333 A1 | 10/2011 | Pomerantz et al. | |
| 2012/0016838 A1 | 1/2012 | Arai et al. | |
| 2012/0030723 A1 | 2/2012 | Baum et al. | |
| 2012/0066179 A1 | 3/2012 | Saika | |
| 2012/0150799 A1 | 6/2012 | Matsuzawa | |
| 2012/0151250 A1 | 6/2012 | Saika | |
| 2012/0173686 A1 | 7/2012 | Doyle et al. | |
| 2012/0259946 A1 | 10/2012 | Stockhammer et al. | |
| 2013/0066952 A1 | 3/2013 | Colrain et al. | |
| 2013/0083848 A1 | 4/2013 | Joch et al. | |
| 2013/0110790 A1 | 5/2013 | Matsumoto et al. | |
| 2013/0110967 A1 | 5/2013 | Ueoka et al. | |
| 2013/0117223 A1 | 5/2013 | Niki | |
| 2013/0145112 A1 | 6/2013 | Foster et al. | |
| 2013/0166765 A1 | 6/2013 | Kaufman | |
| 2013/0185756 A1 | 7/2013 | Fröjdh et al. | |
| 2013/0254631 A1 | 9/2013 | Luby et al. | |
| 2013/0262385 A1 | 10/2013 | Kumarasamy et al. | |
| 2013/0262766 A1 | 10/2013 | Lee et al. | |
| 2013/0297700 A1 | 11/2013 | Hayton et al. | |
| 2013/0304706 A1 | 11/2013 | MacInnis | |
| 2013/0325899 A1 | 12/2013 | Mohaban et al. | |
| 2014/0006350 A1 | 1/2014 | Fukui et al. | |
| 2014/0052825 A1 | 2/2014 | Luecke et al. | |
| 2014/0058831 A1 | 2/2014 | Duva et al. | |
| 2014/0122658 A1 | 5/2014 | Haeger et al. | |
| 2014/0130055 A1 | 5/2014 | Guha | |
| 2014/0156616 A1 | 6/2014 | Thakkar et al. | |
| 2014/0164449 A1 | 6/2014 | Kim et al. | |
| 2014/0172504 A1 | 6/2014 | Duva et al. | |
| 2014/0173185 A1 | 6/2014 | Belluomini et al. | |
| 2014/0173230 A1 | 6/2014 | Smith et al. | |
| 2014/0280465 A1 | 9/2014 | Pakula et al. | |
| 2014/0289191 A1 | 9/2014 | Chan et al. | |
| 2014/0307734 A1 | 10/2014 | Luby et al. | |
| 2014/0314215 A1 | 10/2014 | Duva et al. | |
| 2014/0379768 A1 | 12/2014 | Matsuzawa | |
| 2015/0032690 A1 | 1/2015 | Hoque et al. | |
| 2015/0370827 A1 | 12/2015 | Parkison et al. | |
| 2016/0063027 A1 | 3/2016 | Brand | |
| 2016/0072886 A1 | 3/2016 | Lin et al. | |
| 2017/0017665 A1 | 1/2017 | Savenok et al. | |
| 2018/0048692 A1 | 2/2018 | Fröjdh et al. | |

OTHER PUBLICATIONS

Notice of Deficiencies for EP Application No. 15835741.8 dated Dec. 21, 2018, EPO.
Notice of Deficiencies for EP Application No. 15835803.6 dated Nov. 12, 2018, EPO.
European Search Report for EP Application No. 15835741.8 dated Feb. 2, 2018, The Hague.
European Search Report for EP Application No. 15835803.6 dated Jan. 15, 2018, The Hague.
Patent Cooperation Treaty International Search Report and the Written Opinion for PCT/US2015/046704, ISA/RU, Moscow, Russia, dated Dec. 24, 2015.
The International Preliminary Report on Patentability for PCT/US2015/046704 dated Mar. 9, 2017.
The International Preliminary Report on Patentability for PCT/US2015/046711 dated Mar. 9, 2017.
A Notice of Deficiencies for EP Application No. 15835803.6 dated Aug. 23, 2019, EPO, Rijswijk, The Netherlands.
The First Office Action for Chinese Patent Application No. 2015800389544, dated Oct. 11, 2019, CNIPA, China.

* cited by examiner

METHOD AND SYSTEM FOR ROUTING DATA FLOWS IN A CLOUD STORAGE SYSTEM

CROSS-REFERENCE TO RELATED APPLICATIONS

This application is a continuation of U.S. application Ser. No. 14/834,984 filed Aug. 25, 2015. The Ser. No. 14/834,984 application claims the benefit of U.S. Provisional Application No. 62/041,941 filed on Aug. 26, 2014, the contents of which are hereby incorporated by reference.

TECHNICAL FIELD

The present invention relates generally to file sharing and synchronization in cloud storage networks and, more particularly, to multilevel systems for file sharing and synchronization.

BACKGROUND

The demand for data storage has been rapidly escalating because, as the amount of data such as digital media stored by users grows, so does their need to store digital media reliably over extended periods of time. Storage systems to store digital media range from a local storage media (e.g., CDs and backup tapes) and network storage systems (such as NAS or NAT) to cloud-based storage system.

Network storage systems such as NAS and NAT provide access to files to users connected in a local area network though standard file sharing protocols (e.g., common internet file system (CIFS) or network file system (NFS)).

Cloud-based storage systems, also referred to as cloud storage services (CSS), provide mass storage through a web service interface available through the Internet. The storage infrastructure includes a distributed array of geographically distributed data centers connected to a plurality of clients through a wide area network (WAN).

FIG. 1 illustrates a storage system 100 designed to provide cloud storage services. The system 100 includes a distributed array of geographically distributed data centers 110-1 to 110-M (hereinafter referred to collectively as data centers 110 or individually as a data center 110, merely for simplicity purposes) connected to a plurality of clients 120-1 to 120-N (hereinafter referred to collectively as clients 120 or individually as a client 120, merely for simplicity purposes) through a wide area network (WAN) 130.

A data center 110 typically includes servers and mass-storage-facilitating cloud storage services to the clients 120. Such services enable applications including, for example, backup and restore of data, data migration, data sharing, data collaboration, and so on. Cloud storage services are accessible from anywhere in the world. To this end, each client 120 implements a web services interface designed to at least synchronize data with the data centers 110. Applications enabled by the cloud storage services are not typically aware of the specifics of the services and the underlying data synchronization operations. The disadvantage of commercially available cloud storage services is that such services do not implement standard file sharing protocols (e.g., common internet file system (CIFS) or network file system (NFS)). Furthermore, accessing files stored in the cloud storage is typically slower than accessing files stored in local storage devices.

Although not shown in FIG. 1, the storage system 100 may include a plurality of cache servers to accelerate data storage and retrieval as well as cloud agents allowing access to files remotely stored in the data centers 110. A cloud agent may be a hardware component, a software component, or a combination thereof, which is connected to or associated with a specific workstation, server, or other computing device. For example, a workstation agent may be software installed on a personal computer, such as to integrate this workstation with the CSS and/or cloud integrated storage devices. As another example, a mobile device agent may be an application installed on a mobile device, such as a smartphone, acting to integrate the mobile device with the cloud storage system.

The cloud storage system can be utilized to share content between users. For example, in enterprises, data can often be shared between different departments, branches, and individual users. Each such entity that can save or share files is typically assigned, e.g., different permission rules. Furthermore, each user may use a different type of device (node), each of which may be, but is not limited to, a PC, a smartphone, a storage appliance, a file server, and so on. Thus, a folder stored in the cloud storage (a data center 110) can be accessed by multiple different users from different geographical locations. In addition, a user can access the cloud storage from different locations and/or different devices associated with the user.

An essential requirement of a cloud storage system is to synchronize data between local devices and remote storage, between different devices of the same user, and among users that share the same content. Another essential requirement is to provide sufficient data throughout for storage and retrieval of data from any device and/or geographical location accessing the system.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The disclosed embodiments include a computing device for allowing storage services with a cloud storage system. The computing device comprises: a processing unit; and a memory, the memory containing instructions that, when executed by the processing unit, configure the computing device to: dynamically select a best route between the cloud storage system (CSS) and the computing device, wherein the CSS is geographically remote from the computing device; and establish, based on the selected best route, a data flow between the CSS and the computing device, wherein the data flow is established to allow at least a storage service related to the CSS.

The disclosed embodiments also include a method for allowing storage services with a cloud storage system. The method comprises: dynamically selecting a best route between a cloud storage system (CSS) and a computing device, wherein the CSS is geographically remote from the computing device; and establishing, based on the selected best route, a data flow between the CSS and the computing device, wherein the data flow is established to allow at least a storage service related to the CSS.

The disclosed embodiments also include a distributed storage system for allowing an access to a plurality of cloud storage systems. The distributed storage system comprises: a plurality of cloud storage systems (CSS); and a plurality of computing devices, wherein the plurality of computing devices are in close proximity to each other and are geographically remote from each of the plurality of CSSs, wherein each computing device is configured to: dynamically select a best route between a CSS of the plurality of CSSs and the computing device; and establish, based on the selected best route, a data flow between the CSS and the computing device wherein the data flow is established to allow at least a storage service related to the CSS.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
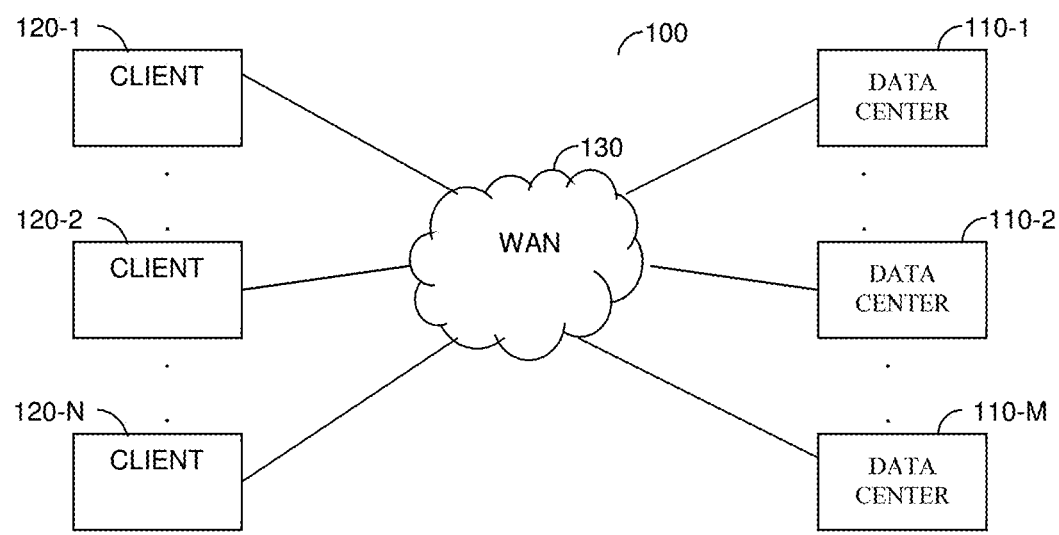
FIG. 1 is a diagram of a storage network system.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
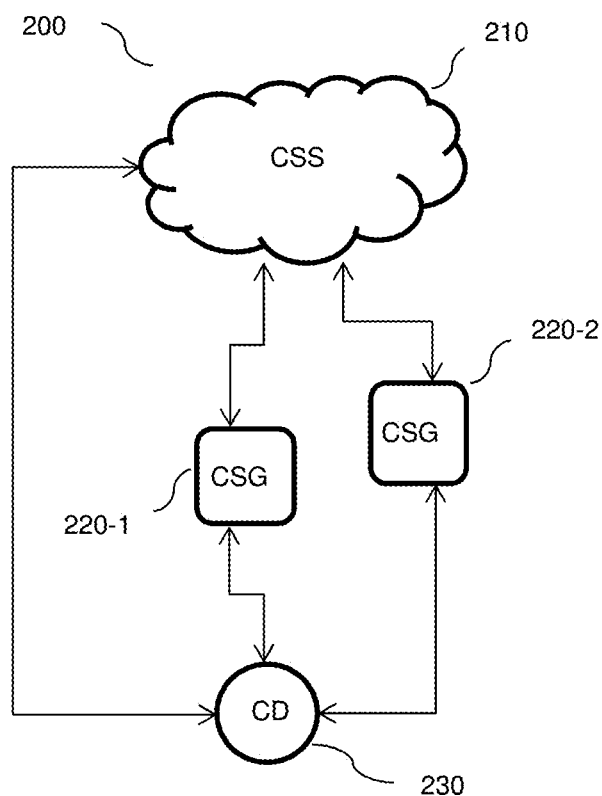
FIG. 2 is a schematic diagram illustrating a multilevel file system configured according to an embodiment.

FIG. 2 shows an exemplary and non-limiting schematic diagram of a multilevel file sharing and storage network 200 according to an embodiment. In the embodiment, a cloud storage system (CSS) 210 is communicatively connected to one or more cloud storage gateways (CSGs) 220-1 and 220-2 (hereinafter referred to individually as a CSG 220 and collectively as CSGs 220, merely for simplicity purposes).

A CSG 220 may be a hardware component, a software component, or a combination thereof. The CSG 220 may provide caching, WAN acceleration, storage acceleration and the like to an endpoint 230. The endpoint 230 may be, but is not limited to, a client device executing software agents that can remotely access files stored in the CSS 210 or in a cloud-enabled storage device, for example using the method described in the co-pending patent application Ser. No. 13/205,238, assigned to common assignee, which is hereby incorporated by reference for all that it contains. In further embodiments, an agent may be installed on an endpoint 230. The agent permits the endpoint to access and synchronize data with the CSS 210 and/or one of the CSGs 220. For example, a workstation agent may be software installed on a personal computer that permits integration of the workstation with the CSS 210. As another example, a mobile device agent may be an application installed on an endpoint 230, such as a smartphone, acting to integrate the endpoint 230 with the CSS 210, another client, and/or a CSG 220.

Each of the endpoint 230 and the CSGs 220 may be a computing device that includes, but is not limited to, a storage, a processing unit, and a memory. The memory contains instructions that, when executed by the processing unit, configure the computing device to perform the methods described herein.

Some CSGs 220 may reside in close proximity to each other with respect to geographical locations, network topology access delay, bandwidth criteria, cost criteria, administrative configuration, and so on. In one embodiment, a plurality of CSGs 220 may be part of a trusted network, thereby allowing an endpoint 230 to access each CSG 220 in a trusted network. In another embodiment, one or more CSGs, e.g., the CSG 220-2, can provide shared, large capacity block cache services to increase the probability that block reads can be satisfied locally from the regional cache and without requiring access to the CSS 210. This shared block capacity is advantageous because the CSS 210 is often located at a distant datacenter and such a technique may reduce latency, reduce load on the WAN link, and increase the overall responsiveness and throughput of the cloud storage service. It should be noted that, in certain embodiments, the CSGs 220 can be configured with a local cache (e.g., a layer1-cache) as well.

The endpoint 230 is connected to the CSS 210 either through a direct connection or through one or more of the CSGs 220. It should be noted that only one endpoint 230 is shown in FIG. 2 merely for the sake of simplicity and without limitation on the various disclosed embodiments. If the endpoint 230 is connected to the CSS 210 both through a direct connection and through one of more of the CSGs 220, upon an attempt to retrieve data from the CSS 210 or to store data in the CSS 210, the endpoint 230 may be prompted to provide a selection of a preferred route, wherein the preferred route is either a direct connection or a connection through the CSGs. If a user of the endpoint 230 selects the connection through the CSGs 220, a best route for data flow through the CSGs 220 may be determined.

The CSGs 220 may provide data synchronization services for data flows in the incoming direction (clients to CSS), outgoing direction (CSS to clients), or both. A data flow may be, but is not limited to, file synchronization ("sync relation) between the CSS 210 and a computing device, caching ("cached access relation") of files in the CSS 210, backup ("backup relation") of files to the CSS 210, and remote access ("remote access relation") to files in the CSS 210 or in a computing device. For example, a data flow may be synchronizing a file obtained from a CSS in an endpoint. In an embodiment, data flows can be set through data flow templates. The data flow templates are typically maintained in a centralized system as described further herein below with respect to FIG. 8.

In sync relation data flows, selected contents, e.g., folders or files are synchronized, either in one direction across a data flow link, or across both directions of the data flow link. Sync relation data flows are discussed further in co-pending US Patent Application No. 2010/0161759, entitled "STORAGE DEVICE AND METHOD THEREOF FOR INTEGRATING NETWORK ATTACHED STORAGE WITH CLOUD STORAGE SERVICES" (hereinafter, the '759 Application), assigned to common assignee, which is hereby incorporated by reference for all that it contains.

In backup access relation data flows, the content of the file or folder on one entity is continuously or periodically copied on the other file or folder. In such flows, updates are unidirectional. In remote access relation data flows (also known as direct access data flows), read data is retrieved directly on demand from a peer node (as a non-limiting example, a peer node may be an endpoint within the same level of a hierarchical file collaboration network). Written data may then be stored directly to the peer node.

In cached access data flows, read data is retrieved directly from a peer node and cached locally. Written data is stored to the peer node. Such storage may be performed asynchronously, and may be performed with an optimized delta-encoding protocol or WAN acceleration. Cached access data flows are discussed further in the above-referenced '759 Application.

In addition to the aforementioned relation types, relations may include various configurable attributes. Such attributes may include, but are not limited to, the content that will be synchronized or cached as part of the relation, the content to be excluded from synchronization or caching (for example, temporary files may not be synchronized), Quality of Service (QoS) settings that may be either permanent or based on specific schedules (e.g., bandwidth limits, Diffsery tags, and so on), Digital Rights Management (DRM) instructions relating to content obtained over the relation that may be utilized to control use of such content after the content has been received (e.g., controlling the user's ability to view, copy, print, and/or share the received contents), and locking policies (e.g., manually or automatically locking files or folders after access). Support for locking policies may be desirable, particularly in massive shared folders, where automatic locking may be advantageous.

In various embodiments, a plurality of relations of data flows may be defined for a single file or folder between two entities. In some embodiments, such relations may be defined by users with administrative privileges and/or by users of individual entities.

In an embodiment, the relation for a given file or folder may be changed dynamically. When a relation is changed, different actions may be taken depending on which type the relation began or ended as. As a non-limiting example, when a relation changes from a cached relation to a sync relation or to a backup relation, the entity that cached the data may utilize the cached copy for a backed up or synchronized copy of the file or folder and may only request the portions of the file or folder that have not been cached from the matching entity. As another non-limiting example, if a relation changed from sync access or backup access to cached access, the entity may only need to change the labeling for the synchronized or backed up copy to mark it as cached. In this case, the data may be discarded based on cache management policy.

In one example, the endpoint 230 or a CSG 220 may be configured to regularly synchronize files that are frequently accessed locally so that the latest version of such files can be accessed immediately at local speed, while less frequently accessed files may not be stored locally and, instead, may be fetched from the cloud upon read or write request (such direct read and write requests may still be accelerated by the block level cache). As usage patterns change, specific files or folders may be transitioned automatically from cached to direct access or vice versa. Information regarding which files are stubs is persistently tracked, and such stub files are synchronized. Files that are synchronized are kept up to date using the cloud file synchronization protocol. Stub tracking and synchronization are described in further detail herein below with respect to FIG. 5.

To support very large files, the synchronization may be on a sub-file granularity such that, for example, frequently accessed regions of the file may be regularly synchronized, while other regions of the file are fetched only on demand. The regions of each file to be synchronized may be persistently tracked.

In a preferred embodiment, the synced and cached files are all exposed by a virtual file system driver (running either in user level or in kernel level) as a unified virtual file system, thereby providing the user seamless read/write access to all files, whether they are available locally (synced) or are cached. In an embodiment, the files in the virtual file system are arranged in a multi-level namespace. An exemplary implementation of the multi-level namespace is disclosed in U.S. patent application Ser. No. 14/709,902 assigned to the common assignee, which is hereby incorporated by reference for all the useful information it contains.

In an embodiment, the metadata of all files are synchronized to the endpoint 230 or to the CSG 220. The system stores the metadata locally in the endpoint 230 so that directory listing requests can be satisfied quickly and even without internet connectivity. In one possible implementation, files are stored as stub files in the local filesystem, containing only the synchronized regions of the file (if there are any). In this implementation, when a directory listing request is received from a user, the listing is provided directly by the underlying filesystem of the endpoint 230 by simply passing through the requests. When the endpoint 230 is not connected to the CSS, the endpoint 230 may still provide full access to browse the entire global directory structure. However, attempting to access stub files which are not synchronized locally will result in the client receiving an error result. Synchronization of portions of files is described further herein below with respect to FIG. 6.

In another embodiment, the entire metadata is not synchronized to every endpoint. Instead, each endpoint synchronizes only selective portions of the cloud storage directory structure. This may be dynamic based on usage patterns, wherein folders which are frequently accessed are synchronized automatically, while folders which were not accessed recently are synchronized only on demand. At times when the endpoint is not connected to the CSS due to connectivity problems, it may still provide access to browse the directory structure. Attempting to list the contents of folders which were not synchronized locally will result in the client receiving an error result or an empty listing. Selective synchronization of portions of cloud storage directory structure is described further herein below with respect to FIG. 7.

In another embodiment, cached relations may be generated automatically. In such an embodiment, an element may establish a cached relation for a specific file or folder if such a relation will assist with overall system performance by, e.g., reducing access latency and/or internet traffic. Such automatically generated relations may not require any "handshake" between the two entities, and may be established and/or cancelled by an entity. A "handshake" between two entities occurs when one entity indicates to another entity that it desires to engage in communication.

According to various embodiments, when the endpoint 230 attempts to store or obtain data in the CSS 210, it may do so through any of the CSGs 220 and/or through a direct connection to the CSS 210. A route is a path from the endpoint 230 to the CSS 210. A route may be a direct connection from an endpoint to a CSS. A route may also include a connection to the CSS 210 through one or more CSGs 220. In such embodiments, determination of which route to use is typically based on which CSG 220 provides the best connection. The best connection may be considered based on one or more of the following criteria: bandwidth, response time, price, data flow type, and the like. Determination of best connection is discussed further herein below with respect to FIG. 4.

As a non-limiting example according to the embodiment shown in FIG. 2, a user operating a mobile device (i.e., an endpoint 230) attempts to save a file in the CSS 210. Upon analysis of the available routes, it is determined that CSG 220-1 and CSG 220-2 are demonstrating slow response times and, therefore, that the best route for saving the data is via a direct connection between the endpoint 230 and CSS 210. Thus, in this example, the endpoint may save data to the CSS 210 through a direct route.

As another non-limiting example according to the embodiment shown in FIG. 2, a user operating a workstation (i.e., an endpoint 230) attempts to retrieve a file from the CSS 210. Upon analysis of the available routes, the direct connection between the endpoint 230 and the CSS 210 is determined to be unavailable. Additionally, CSG 220-1 has higher available bandwidth and/or lower latency than CSG 220-2. Consequently, the best route is determined to be the flow of data that passes through CSG 220-1. As a result, the user retrieves the data from the CSS 210 using the endpoint 230 via the CSG 220-1.

Figure 3:
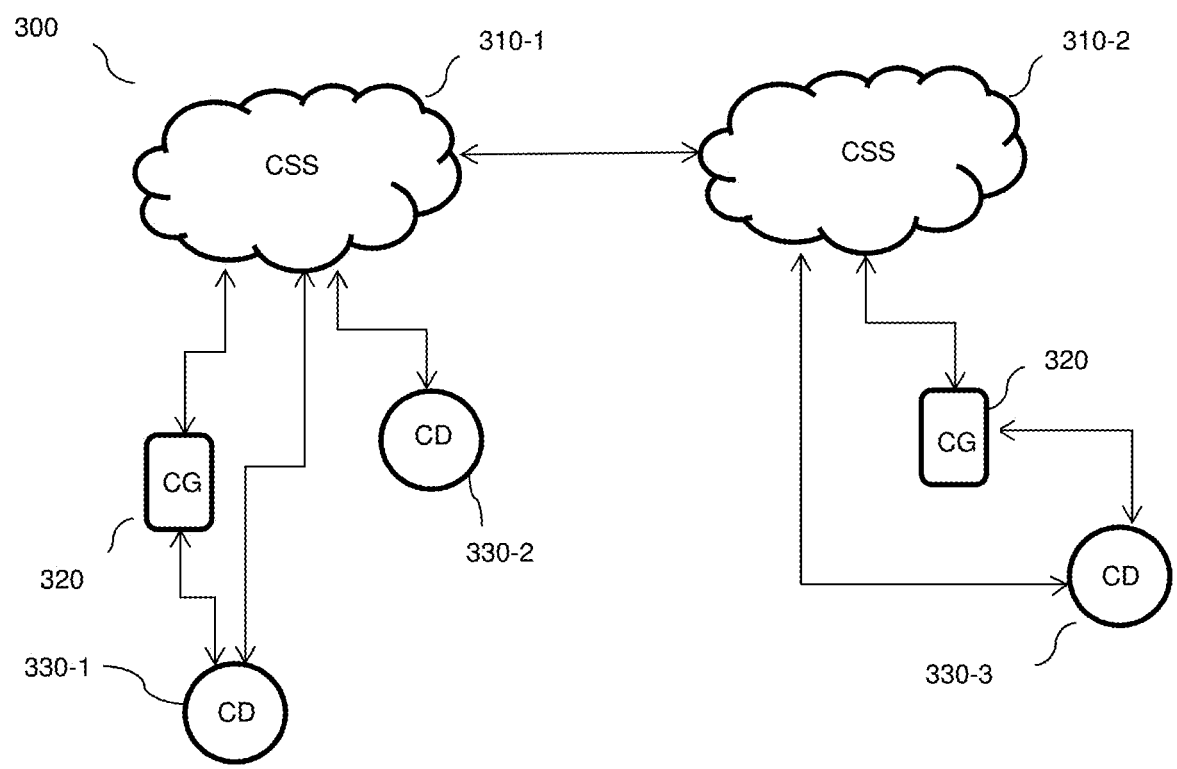
FIG. 3 is a schematic diagram illustrating a multilevel cloud storage file system according to an embodiment.

FIG. 3 shows an exemplary and non-limiting schematic diagram 300 of a multilevel file sharing and storage network featuring multiple cloud storage systems according to an embodiment. In the embodiment, cloud storage systems (CSSs) 310-1 and 310-2 are communicatively connected to one or more endpoints 330-1 through 330-3 (hereinafter referred to individually as a CSS 330 and collectively as CSSs 330, merely for simplicity purposes) and one or more cloud storage gateways (CSGs) 320. The endpoints 330 may be, but are not limited to, client devices executing software agents that can remotely access files stored in the CSS 310 or in a cloud-enabled storage device, for example using the method described in the co-pending patent application Ser. No. 13/205,238, assigned to common assignee, which is hereby incorporated by reference for all that it contains. The endpoints 330 are typically installed with an agent as defined above. In various embodiments, more than two CSSs 310 may be implemented. Each endpoint 330 and CSG 320 may be, but is not limited to, a computing device including a processor and a memory, the memory containing instructions that, when executed by the processor, configure the computing device to perform the methods described herein.

In an embodiment, upon detecting an attempt to store or retrieve data in a CSS 310, the endpoint 330 is configured to select a preferred route through which to deliver the data. The preferred route is a path for data flow between the endpoint 330 and the CSS 310, and may be either direct or synchronization-based (indirect). A direct route is a direct connection between the CSS 310 and the endpoint 330. A synchronization-based route is an indirect connection wherein data passes through another CSS 310 and/or at least one CSG 320 during data flow. The endpoint 330 may select a preferred route based on, but not limited to, a user selection, predefined user preferences, and so on. If there is no direct route, the synchronization-based route may be determined to be the preferred route.

The CSGs 320 may provide caching, wide area network (WAN) acceleration, and/or storage acceleration to the endpoints 330. Each CSG 320 is further connected to one or more of the endpoints 330. In an embodiment, some or all of the endpoints 330 may be directly connected to a CSS (e.g., the CSS 310-1 or the CSS 310-2).

As a non-limiting example according to the embodiment illustrated in FIG. 3, a client attempts to save data to the CSS 310-2 via the endpoint 330-1. In this example, the endpoint 330-1 does not have any direct connection with the CSS 310-2. Thus, any data flow between the endpoint 330-1 and the CSS 310-2 must pass through the CSS 310-1. Thus, a synchronization-based route is determined to be the preferred route. The best route is determined to be the route that includes data flow from the endpoint 330-1 to CSS 310-1 directly rather than the route that includes data flow from the endpoint 330-1 to a CSG 320. Thus, in this example, the user may save data using the endpoint 330-1 to CSS 310-2 via CSS 310-1.

Figure 4:
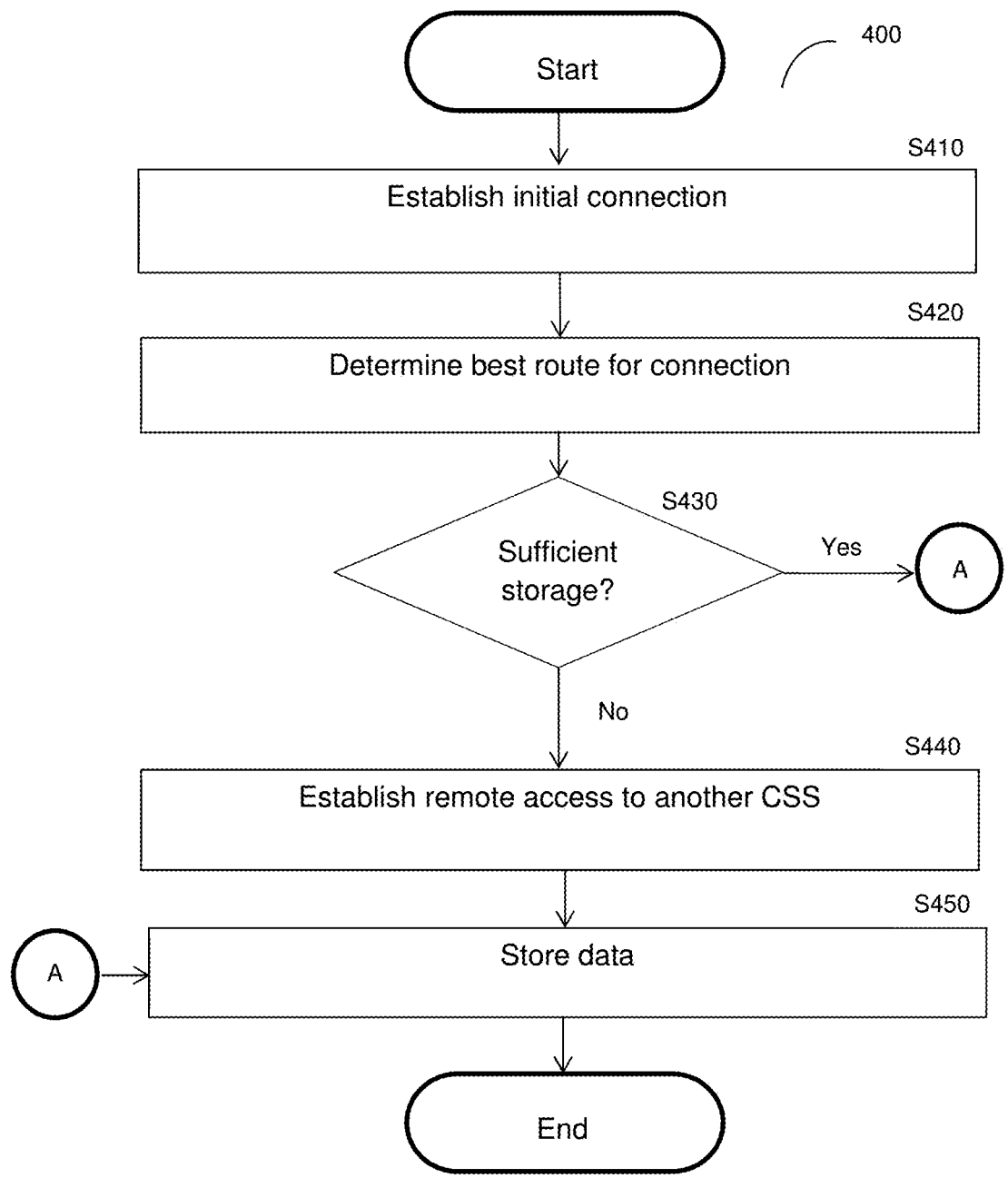
FIG. 4 is a flowchart illustrating a multilevel cloud storage network including more than one cloud storage systems according to an embodiment.

FIG. 4 shows an exemplary and non-limiting flowchart 400 illustrating a method for storing data in a multilevel file sharing network according to an embodiment. In S410, an initial connection is established through a default route. The initial connection is typically established to one or more default connection entities, such as one or more CSGs and/or agents. Alternatively, the initial connection may be a direct route as discussed above. The default route may be set through factory default settings or manual entry by a user. Each default route may be configured with a list of allowed entities through which to connect. Allowed entities are entities that the default connection entity may establish connections to.

As a non-limiting example, a client may allow a user to enter a URL address of the CSG for its default route. When an initial connection is established, the endpoint is connected to the default CSG which provides the client with a list of other entities that the endpoint may connect to through the URL. These other entities may include, but are not limited to, other CSGs and/or CSSs. In an embodiment, if an endpoint loses connection to its default connection point, the endpoint may be connected to an alternative available route. In a further embodiment, if no connection points are available, the endpoint may be directly connected to a CSS.

In S420, the best route for a connection is selected. A route typically includes a link, which may be direct or indirect. A direct link is a direct connection between an endpoint and a CSS. A route may also include, but is not limited to, a local connection point, a CSS, a CSG included in another CSS, an agent, and so on. The selection may be global at a given time such that all interactions related to every maintained relation are performed with another single entity. Alternatively, the selection may be performed for each relation separately such that a different best route is selected for different files and/or folders. Such selection may be based on the data flows defined for the different files and/or folders. In an embodiment, multiple alternative routes for a single relation may be held. In another embodiment, multiple CSSs may operate together to provide entities and clients with optimized service. In such an embodiment, one CSS may cache data for other CSSs and/or serve as a gateway for an endpoint and CSG that are proximally located (e.g., physically or topologically close).

Determination of which route to select as the best route for connection may be based on various criteria including, but not limited to, the relative topological distance (e.g., whether or not the elements are located on the same LAN, the number of routers between two entities, and so on), the type of relation maintained for the specific file or folder with the specific entity, the availability of access to the specified element, the latency in accessing each of the elements, inclusion in or exclusion from a list of allowed elements, and a DNS query resolution.

In an embodiment, if the connection is lost before the request has been completed, a new connection may be established with other available entities. In a further embodiment, selection of the best route for the new connection utilizes the same criteria described herein above with respect to S430.

In S440, it is determined whether the entity on the other end of the selected best route has sufficient storage capacity to fulfill the request to store data. If so, execution continues with S460; otherwise, execution continues with S450. In S450, remote access is established to one or more connection points of another cloud storage system. In S460, data is stored according to the selected best route and/or in any remotely accessed elements.

In an embodiment, additional CSGs may be included as part of a different cloud storage system. In such embodiments, the CSS or CSG may serve as a proxy for the requested relation. In various embodiments, the requesting endpoint or CSG may not be aware of the proxying and may be provided with service that is of similar quality to local service. In a further embodiment, the proxy may be canceled once a local or other proximate storage space is available.

In another embodiment, CSSs and CSGs may use other CSSs and connection points as cache services. This may occur, e.g., when the other CSS or connection point is proximately closer (physically or topologically), or when the other CSS or connection point demonstrates less latency. In such an embodiment, a CSS or CSG that needs to gain access to a specific file or folder may obtain access via a cache of one of the other CSSs or connections rather than by accessing the other CSS through the selected best connection.

Figure 5:
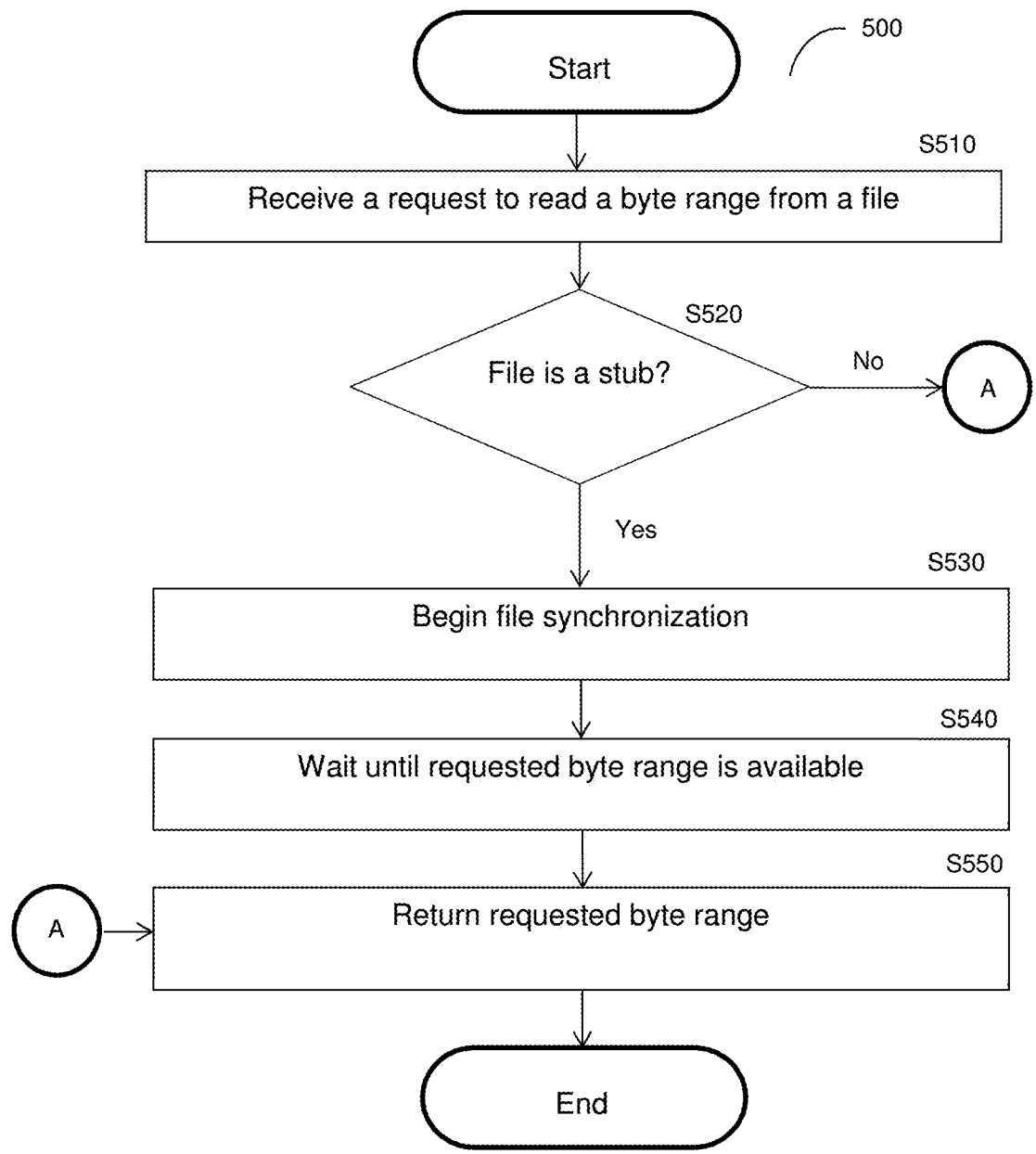
FIG. 5 an exemplary and non-limiting flowchart illustrating stub file tracking and synchronization according to an embodiment.

FIG. 5 is an exemplary and non-limiting flowchart 500 illustrating stub file tracking and synchronization according to an embodiment. In S510, a request to read a byte range from a file is received. In an embodiment, such a request may come from an endpoint (e.g., an endpoint 330). In S520, it is checked whether the requested file is a stub file. If so, execution continues with S530; otherwise, execution continues with S550. In S530, file synchronization of the stub file begins. In S540, execution ceases until the requested byte range becomes available for delivery. In S550, the requested byte range is returned.

Figure 6:
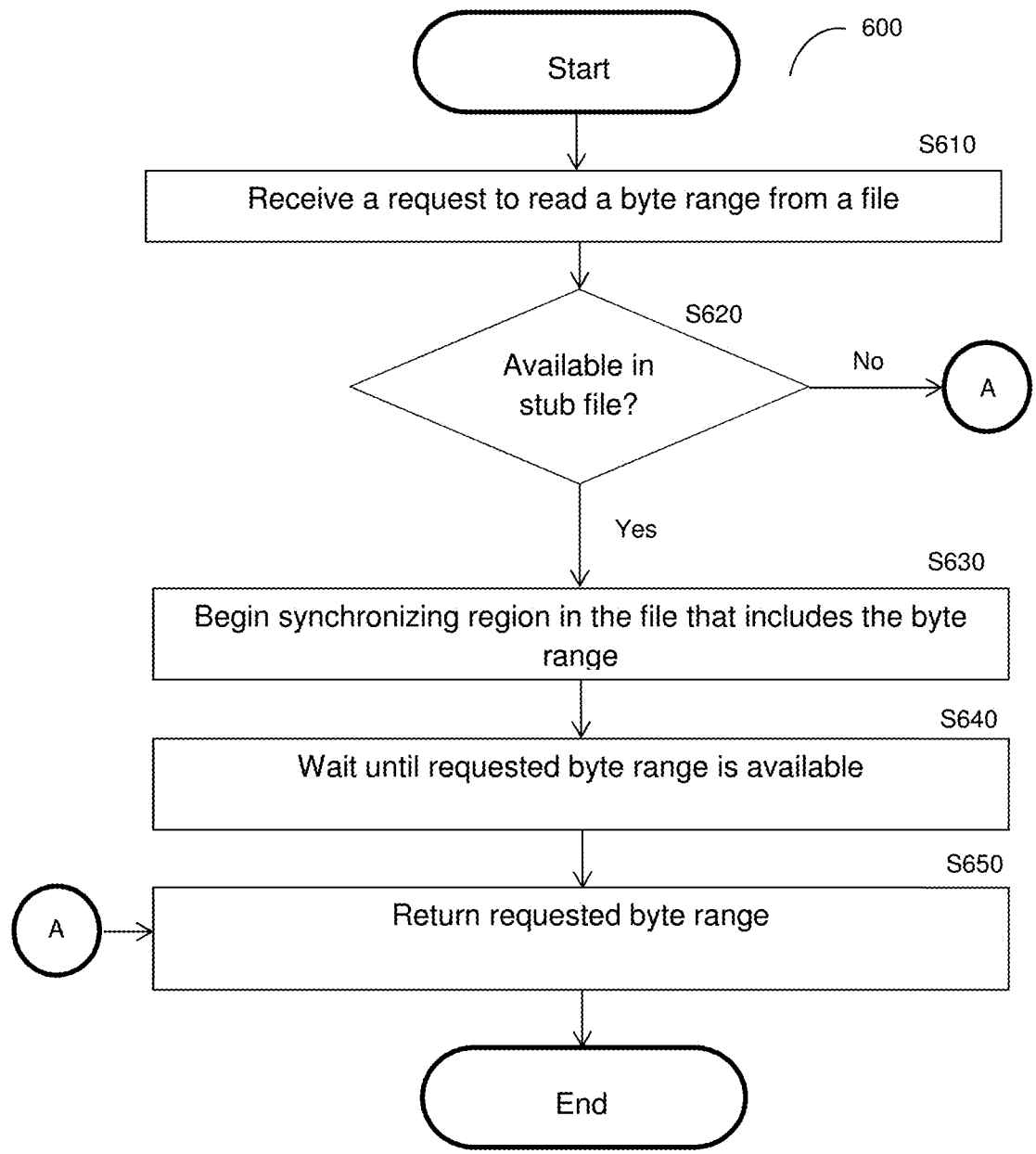
FIG. 6 is an exemplary and non-limiting flowchart illustrating synchronization of regions of a file according to an embodiment.

FIG. 6 is an exemplary and non-limiting flowchart 600 illustrating synchronization of regions of a file according to an embodiment. In S610, a request to read a byte range from a file is received. In S620, it is checked whether the requested byte range is available in a stub file. If so, execution continues with S630; otherwise, execution terminates. In an embodiment, if the requested byte range is not available in a stub file, the entire file may be synchronized. In S630, synchronization of the region in the file including the byte range begins. In S640, execution ceases until the requested byte range becomes available. In S650, the requested byte range is returned.

Figure 7:
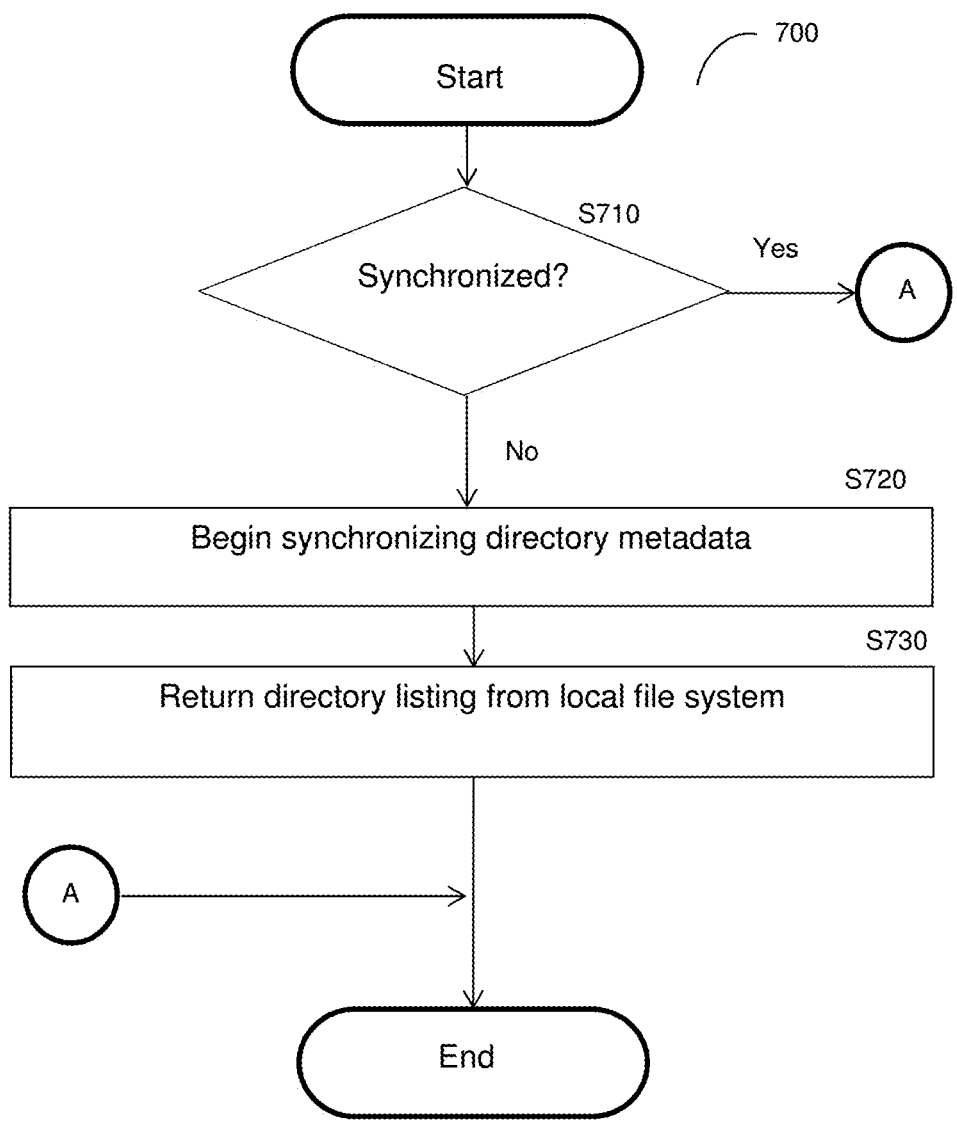
FIG. 7 illustrating the synchronization of metadata on-demand according to an embodiment.

FIG. 7 is an exemplary and non-limiting flowchart 700 illustrating the synchronization of metadata on-demand according to an embodiment. In S710, it is determined whether directory metadata is synchronized. If so, execution continues with S720; otherwise, execution terminates. In S720, directory metadata is synchronized. In S730, the directory listing from the local file system is returned.

Figure 8:
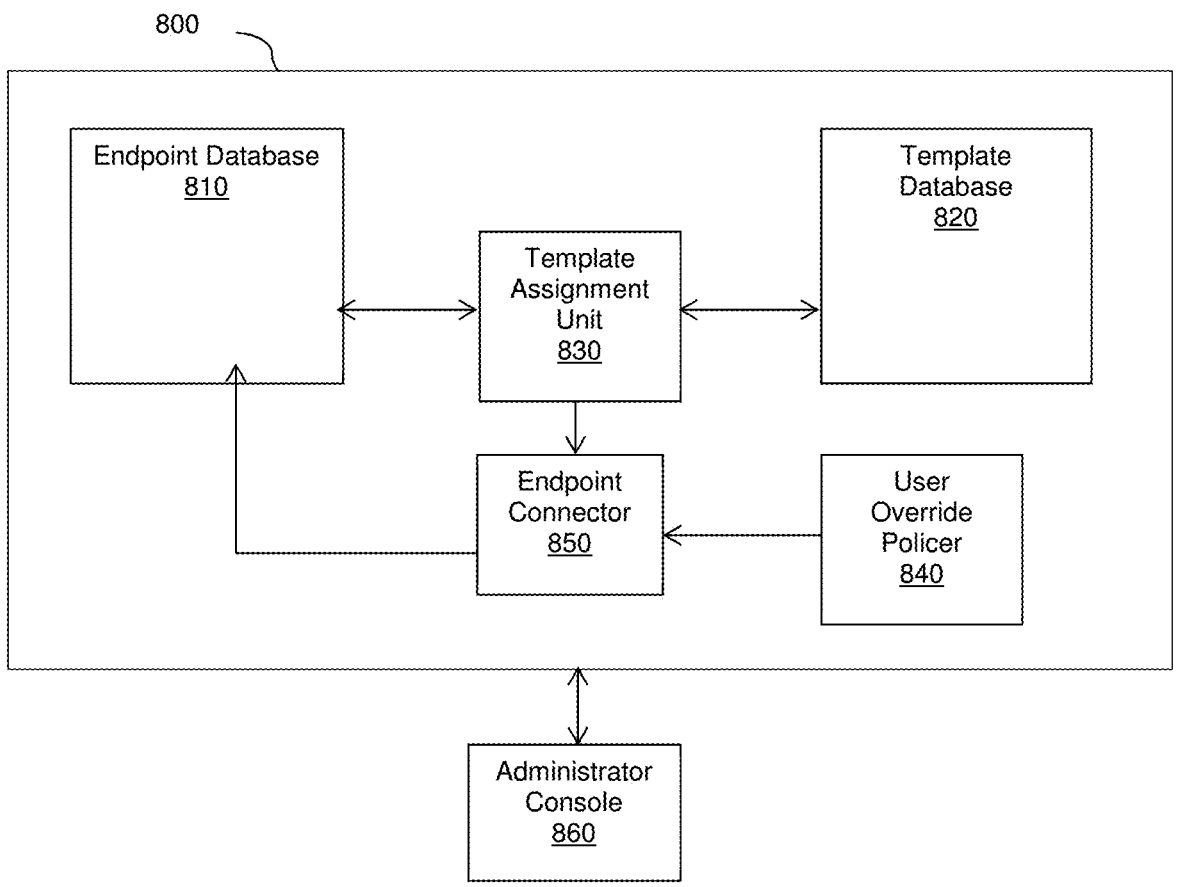
FIG. 8 is an exemplary and non-limiting block diagram of a centralized data flow management system operative in file collaboration networks according to an embodiment.

FIG. 8 shows an exemplary and non-limiting block diagram of a centralized data flow management system 800 operative in file collaboration networks according to an embodiment. The system 800 includes an endpoint database 810 configured to maintain metadata of each endpoint (endpoints not shown) connected to the network (network not shown), a data flow templates database 820, and a template assignment unit 830. The database 820 is configured to maintain data flow templates 825 to be associated with endpoints. The management system 800 also includes a user override policer 840 and an endpoint connector 850.

In an embodiment, the template assignment unit 830 is configured to evaluate criteria related to each endpoint to determine which data flow template or templates to be applied to each endpoint. In a further embodiment, the evaluated criteria may be, but is not limited to, an endpoint's metadata, templates predefined by a user of the endpoint, templates defined by an administrator, security settings, availability of appliances or cache servers in the network, and so on. A metadata of an endpoint may include, for example, a type of endpoint (workstation, server, appliance, mobile device, etc.), an operating system type and version, an owner group, an endpoint host name, and so on.

In an embodiment, a data flow template can be defined by the user (or by a system administrator) and automatically assigned to multiple endpoints. Defining template assignment policies is discussed further herein below with respect to FIG. 8. In an embodiment, templates may be manually assigned to some or all of the endpoints, regardless of criteria.

In one embodiment, the data flow templates may be prioritized according to the order the templates should be assigned to the endpoints. Such data flows may embed smart variables. In an embodiment, templates may further contain information related to configuration of additional device settings such as, for example, backup settings, software updates, and so on. Smart variables are variables that are defined in a template but are evaluated by the endpoint according to its local environment such that they may have different values when interacting with different endpoints.

Endpoints perform substitution of smart variables with their locally applicable values to achieve configuration of the endpoints according to a respective data flow template. If the endpoints are arranged in a hierarchy, the locally applicable values may depend on information relating to the local endpoint and/or to other endpoints in the hierarchy. Additionally, smart variables may be globally defined such that all endpoint connectors can evaluate all smart variables, or may be defined as limited in scope such that only certain endpoint connectors are capable of evaluating any or all of the smart variables.

As a non-limiting example of smart variable substitution, a smart variable named "{MYDOCUMENTS}" may be substituted by the correct file extension of the device owner's "Documents" folder on his or her endpoint device. The correct value may then be used regardless of the user's operating system or configuration.

The template assignment unit 830 is configured to provide the selected templates and their designated endpoint connections to the endpoint connector 850. The endpoint connector 850 applies selected templates and a user override policy of the user override policer 840 to each endpoint via endpoint connections 815. In an embodiment, the template assignment unit 830 may select and apply templates to each endpoint directly rather than through the endpoint connector 850. The user override policy 840 is used by the endpoint to determine whether and how the owner of the endpoint can override the selected template. If the user is permitted to override a selected template, specific data flows may be added or altered locally by that owner. In an embodiment, the management system 800 is communicatively connected to an administrator console 860, which allows to users to override or define errant templates, and/or to control template selection.

Figure 9:
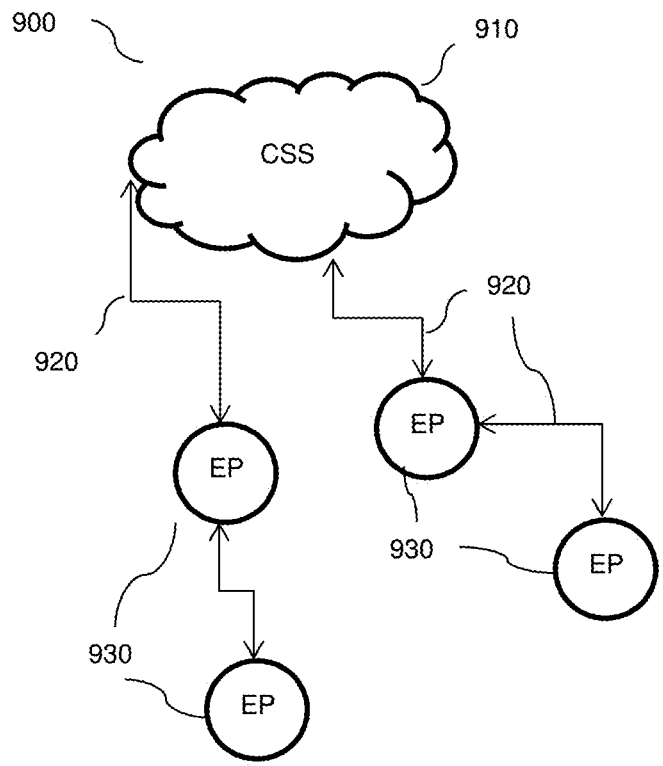
FIG. 9 is a diagram of file collaboration network having a tree topology.

FIG. 9 shows an exemplary diagram of a file collaboration network 900 having a tree topology. In the network 900, a single cloud storage system (CSS) 910 is communicatively connected to one or more endpoints 930 via connections 920. In this network, the endpoints 930 are arranged hierarchically. Consequently, some endpoints may interact with the CSS 910 only through connections to other endpoints. In such tree collaboration networks, data flows are restricted to one data flow path. For example, if an endpoint 930 is connected to the CSS 910 only through another endpoint 930, data being sent to or retrieved from the CSS 910 must flow through the other endpoint 930. In contrast, file collaboration networks having forest and graph-like topologies, discussed further herein below with respect to FIGS. 10 and 11, respectively, may have more than one potential data flow path available to any given endpoint.

Figure 10:
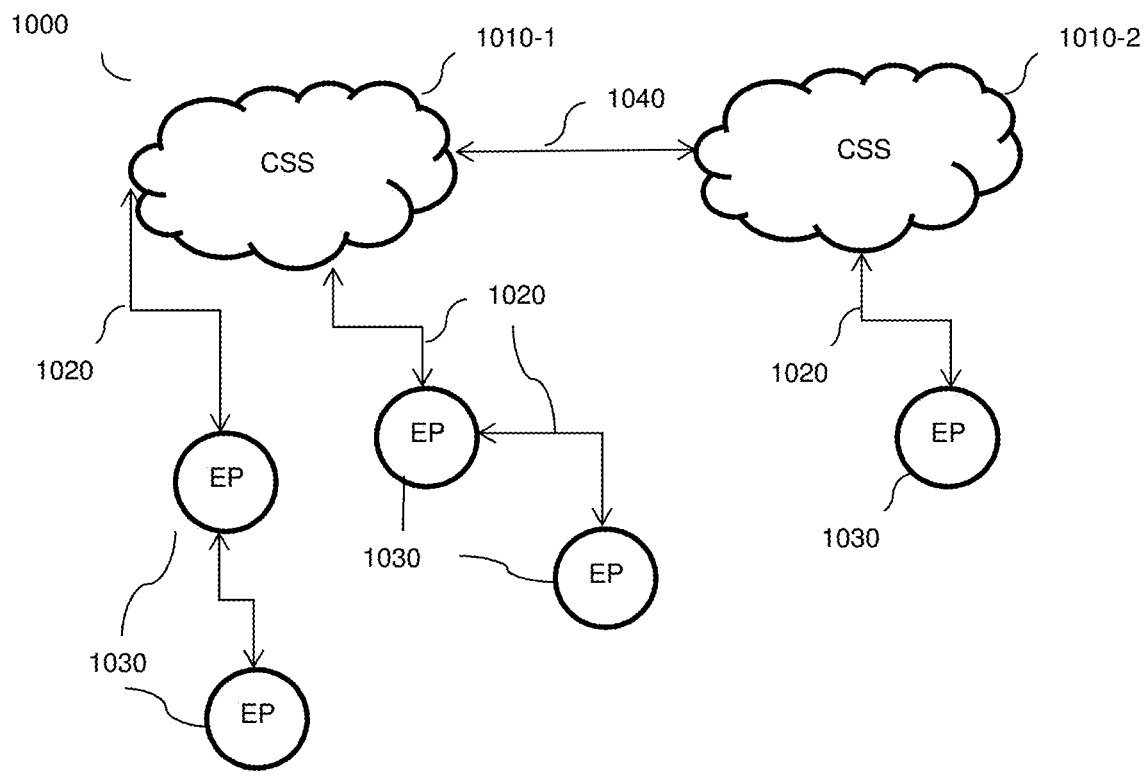
FIG. 10 is a diagram illustrating a file collaboration network having a forest topology.

FIG. 10 shows a diagram of a network 1000 illustrating a file collaboration network having a forest topology. In the network 1000, cloud storage systems (CSS) 1010-1 and 1010-2 are communicatively connected to various endpoints 1030 via connections 1020. Additionally, in this forest type collaboration network topology, the CSS 1010-1 and the CSS 1010-2 are communicatively connected via an interlink 1040. The interlink 1040 may be a bidirectional trust relationship that permits communication of data both to and from each CSS 1010. Alternatively, the interlink 1040 may be one way such that only one CSS 1010 communicates with the other.

The link between CSS 1010-1 and CSS 1010-2 permits each cloud to act as a cloud storage router for the other cloud. As a result, the endpoints 1030 connected to one cloud storage device 1010 may establish data flows to the other linked CSS 1010, either directly (not shown) or indirectly through connections 1020, other endpoints 1030, and/or through a CSS 1010.

Data flows may also be applied to links between portals such as through, for example, caching, selective synching, or direct access. Further, each CSS 1010 may enforce controls over which content can be accessed by users of interlinked cloud storage services. Each endpoint is configured with the correct data flow by means of a respective data flow template selected by a management system (e.g., the management system 800 (FIG. 8)).

Figure 11:
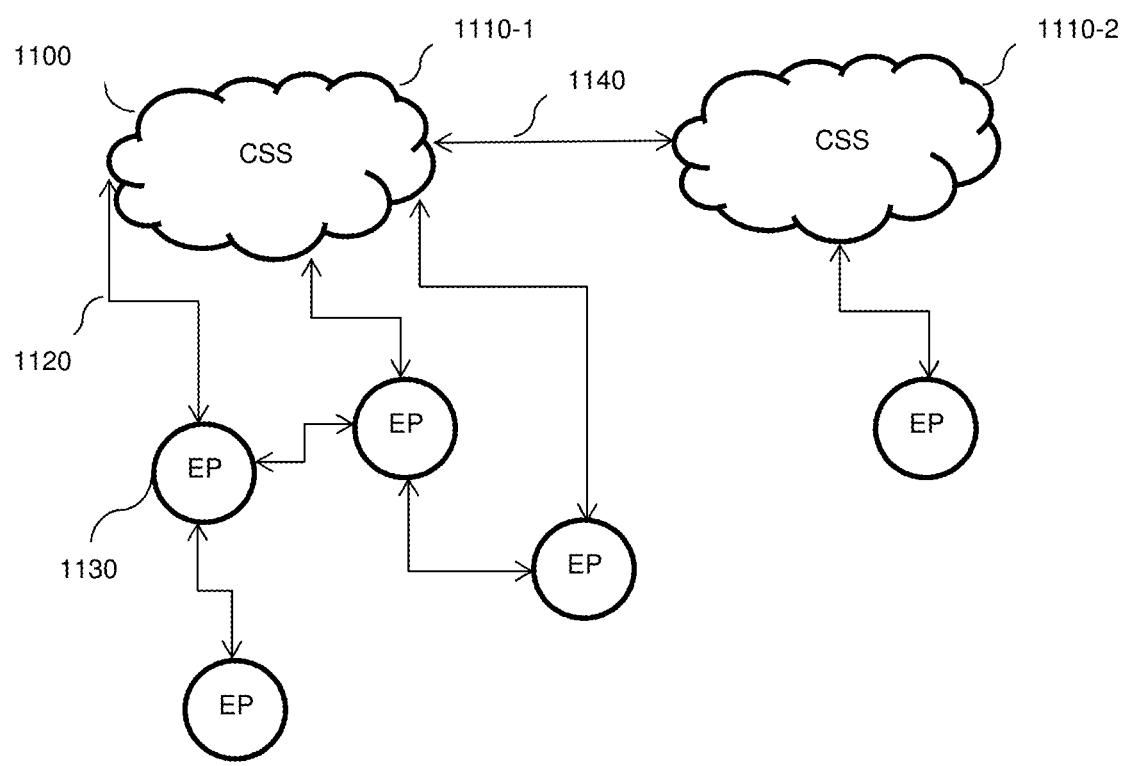
FIG. 11 is a diagram illustrating a collaboration network having a graph-like topology.

FIG. 11 shows an exemplary diagram illustrating a collaboration network 1100 having a graph-like topology according to an embodiment. In the network 1100, like in the forest network topology, each CSS 1110 may be connected to multiple endpoints 1130 either directly or indirectly via connections 1120. In this embodiment, the endpoints 1130 may further be interconnected via connections 1120 such that any or all of endpoints 1130 may possess more than one direct and/or indirect connection to its respective CSS 1110. As an example, as shown, various endpoints may interact with CSS 1110-1, both directly through a connection 1120 between the endpoint 1130 and the CSS 1110-1, and indirectly through a data flow 1120 between two endpoints 1130.

Figure 12:
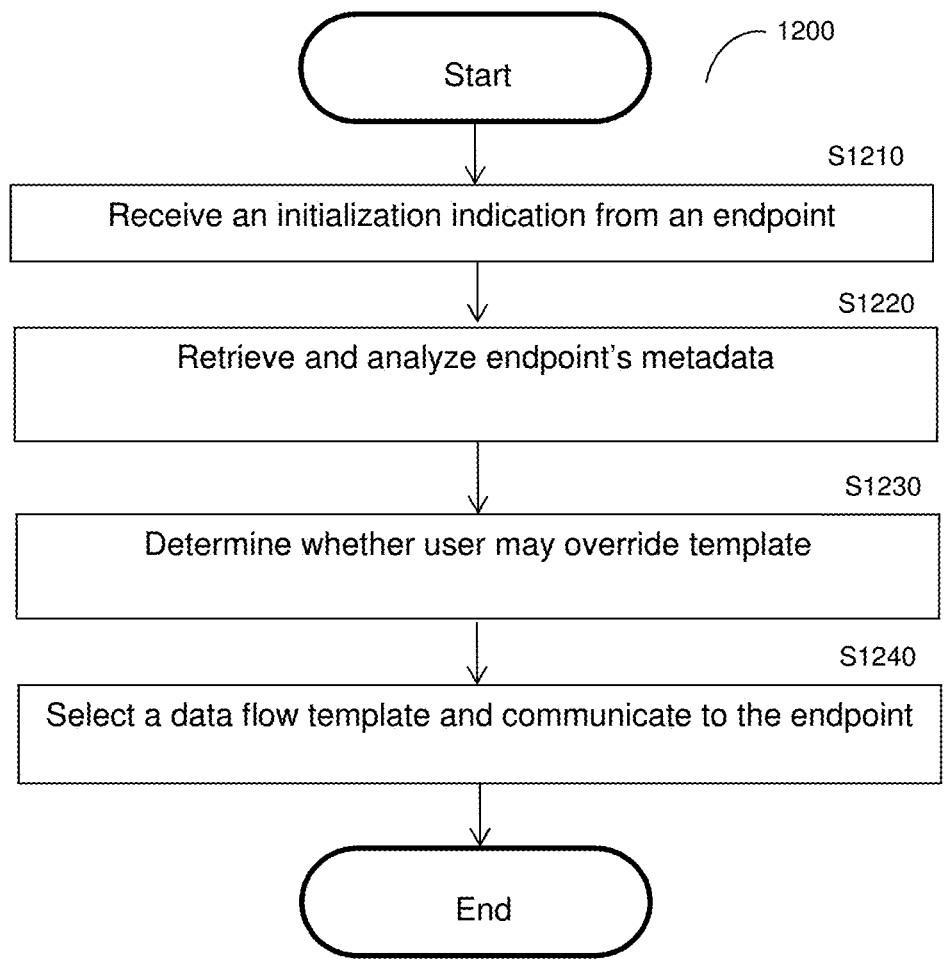
FIG. 12 is a flowchart illustrating a method for establishing data flows using templates in a file collaboration network.

In an embodiment, this interaction may be used to permit dynamic flow selection so as to select the optimal data flow for the transfer of information depending on flow efficiency. Flow efficiency may be determined based on factors such as, e.g., connection 1120 availability and latency. Selecting optimal flows will typically lead to optimized performance and reduced energy consumption. The dynamic selection of data flows is performed through setting of data flow templates FIG. 12 shows a non-limiting and exemplary flowchart 1200 illustrating a method for establishing data flows using templates in a file collaboration network. In an embodiment, the method is performed by a data flow management system, e.g., system 800.

At S1210, an indication that an endpoint is initialized is received. The endpoint is initialized when, for example, a new setting, software, firmware, and/or hardware is installed. Such initialization would likely modify the metadata associated with the endpoint. At S1220, the endpoint's metadata are retrieved from the endpoint, analyzed, and compared against selection criteria for templates to select pertinent templates for each analyzed endpoint. Any changes in the metadata or metadata of new endpoints are saved in an endpoint database. In an embodiment, this analysis is performed by a template assignment unit (e.g., template assignment unit 130) as discussed further herein above with respect to FIG. 1. As noted above, metadata of an endpoint may be, but is not limited to, endpoint type, operating system type and version, owner group, endpoint host name, and so on.

At S1230, it is determined whether a user (e.g., a system administrator) may override the template and manually create data flows. This determination may be based on a user override policy enforced by a user override policer (e.g., user override policer 840). At S1240, responsive to the metadata analysis or the override, an appropriate data flow template is selected and sent to the endpoint. Subsequent utilization of templates and creation of data flow is discussed further herein below with respect to FIG. 17.

As a non-limiting example, a first endpoint attempting to save data to a CSS may belong to a collaboration network topology that is a forest type hierarchical network topology. In such an example, two or more cloud storage services would be communicatively connected, thereby enabling access to any linked cloud storage service either directly or indirectly through any endpoint device in the network, subject to any restrictions on access imposed by the management system. Such topology may further include connections among endpoint devices. In an exemplary embodiment, a template may be selected by a management system and provided to an endpoint.

The first endpoint (e.g., a personal computer running a Windows® 7 operating system) is connected to a CSS indirectly through a connection to a second endpoint (e.g., a cloud storage gateway), wherein the second endpoint is connected to the CSS through a connection (e.g., an Internet connection). In this example, the first endpoint is also connected to a CSS indirectly through a connection to a third endpoint (e.g., another cloud storage gateway), wherein the third endpoint is connected directly to the CSS through a connection (e.g., an Internet connection). The metadata of the first endpoint is analyzed to determine which template(s) to select. In this example, a particular template is associated with Windows® operating systems. Thus, since this endpoint utilizes the Windows® 7 operating system, that template is selected.

Further, in this example, the condition set in the user override policy to determine whether a user may override the selected template is that the user must be an administrator. It is determined that the user is not an administrator, so the results of this determination, along with the user override policy and selected template, are provided to the endpoint.

Figure 13:
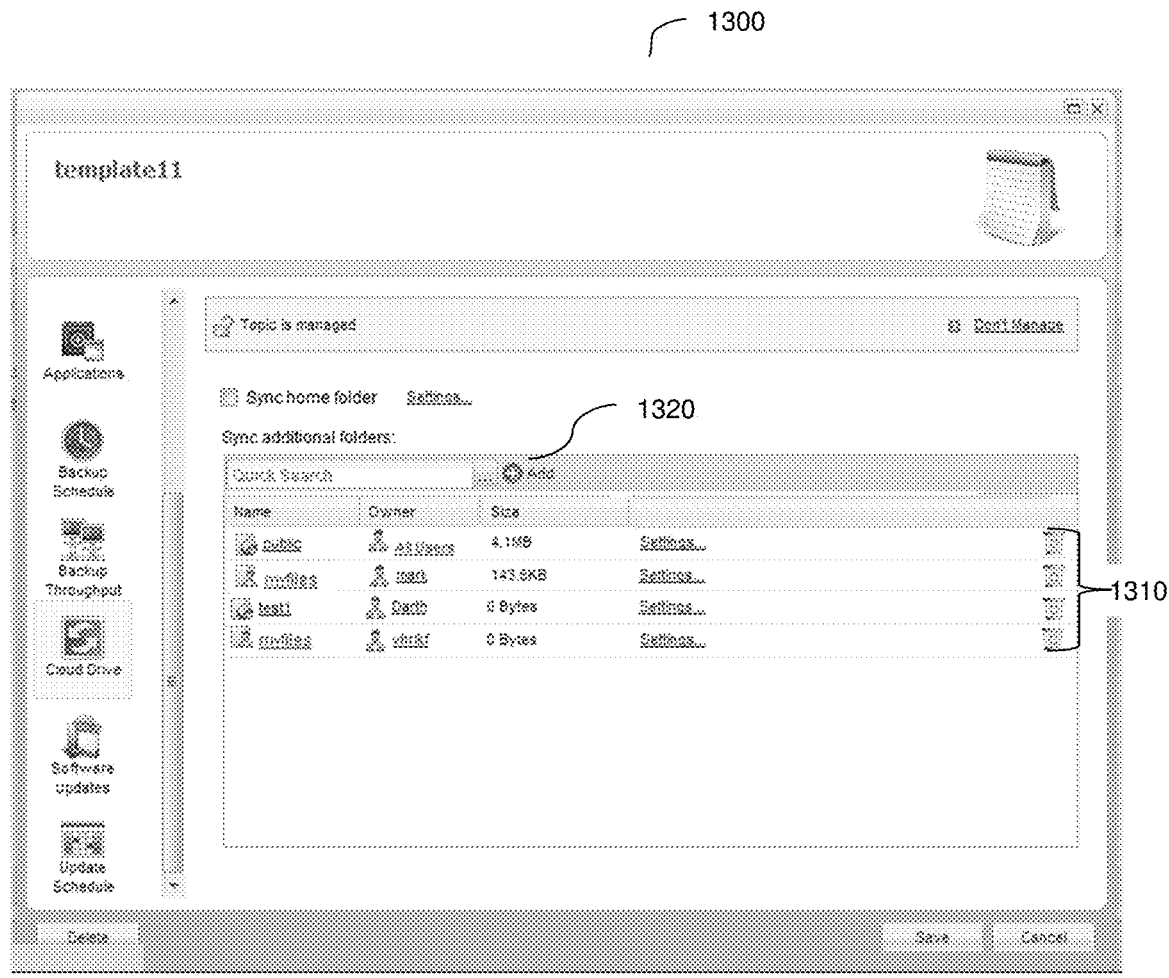
FIG. 13 is a screenshot of a user interface for a template editor according to an embodiment.

FIG. 13 shows an exemplary screenshot 1300 of a user interface for a template editor according to an embodiment. In this embodiment, the user interface includes a list of folders 1310 that are synchronized with an endpoint device. The user may click on add button 1320 to add folders to the list of synchronized content.

Figure 14:
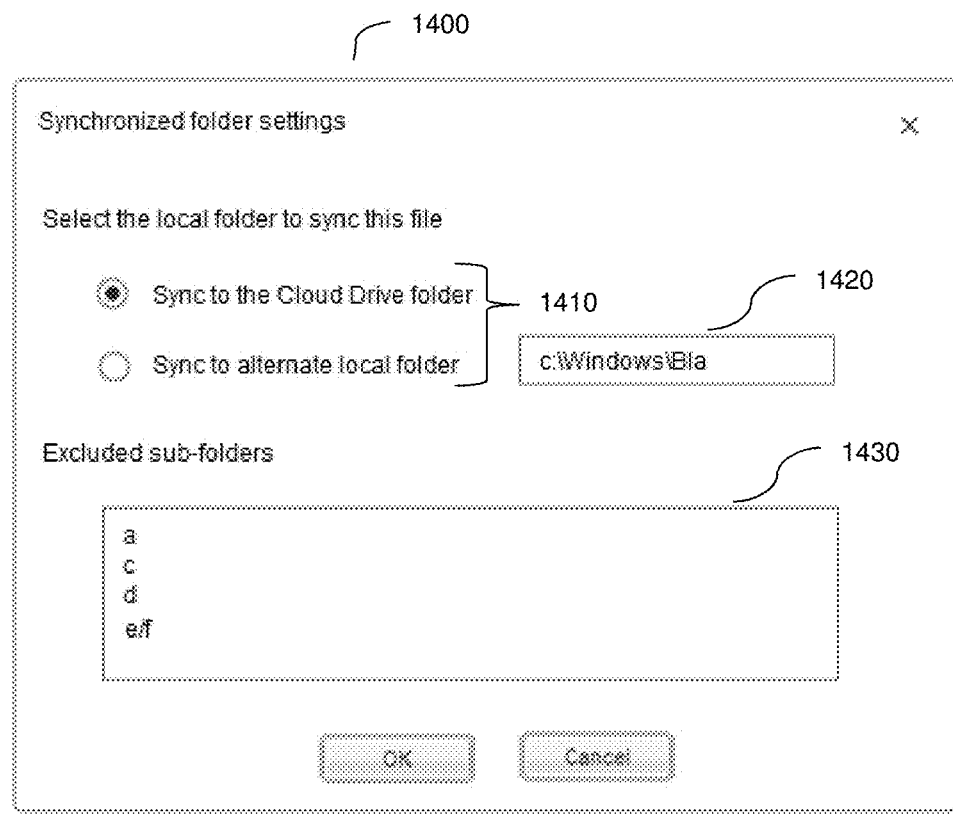
FIG. 14 is a screenshot of a user interface allowing control over settings for a sync relation data flow according to an embodiment.

FIG. 14 shows an exemplary screenshot 1400 of a user interface allowing control over settings for a sync relation data flow according to an embodiment. In the embodiment, a user may select one of two options 1410: synchronizing the local folder with a Cloud Drive folder, or synchronizing the local folder with another local folder. If the user elects to sync the folder to another local folder, he or she would then provide the file extension of that other folder in file extension box 1420. In various embodiments, the user may elect to exclude one or more sub-folders from the synchronization by noting such folders in exclusion box 1430.

Figure 15:
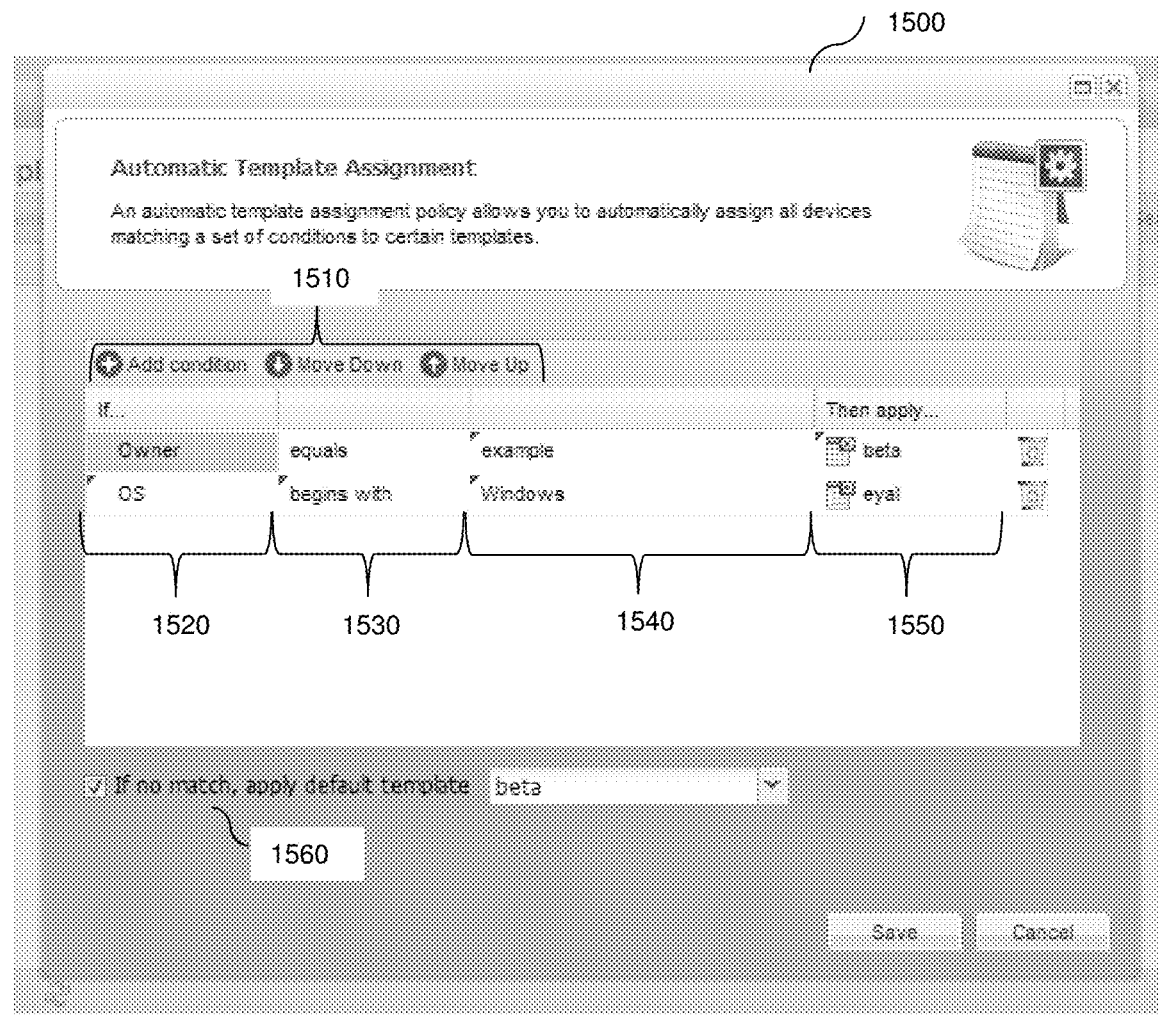
FIG. 15 is a screenshot illustrating a user interface utilized for defining a template assignment protocol according to an embodiment.

FIG. 15 shows an exemplary screenshot 1500 illustrating a user interface utilized for defining a template assignment protocol according to an embodiment. In the embodiment, various conditions that determine whether a template will be appropriately applied to an endpoint are established. Condition management controls 1510 permit a user to add a new condition or select an existing condition to modify. Each condition's relevance is defined by selecting one or more parameter types and defining conditions for relevance. In the embodiment shown in FIG. 15, two parameter types 1520 have been selected: the owner of the endpoint device, and the operating system of the endpoint device. Each parameter type 1520 is associated with a conditional statement 1530. The conditional statement defines the required association between the endpoint device and a comparison parameter 1540. If the conditional statement 1530 is true, then the template noted in template list 1550 is selected for that endpoint. In this embodiment, multiple conditional statements are applied to determine one or more relevant templates. In further embodiments, if multiple templates are selected, either all selected templates may be applied, or a determination may be made based on, e.g., predefined conditions. In various embodiments, if all conditional statements are false, then a default template may be used via, e.g., default check box 1560.

As a non-limiting example, in this embodiment, the condition "equals" as applied to the parameter type "owner" means that the owner name must match the comparison parameter "example" for the template "beta" to be selected. Similarly, according to the second condition, if the operating system name begins with "Windows®," template "TEMP-WIN7" would be selected. Thus, an endpoint device having Windows 7® would qualify, and the template "eyal" would be selected for that endpoint device. Alternatively, if a user did not have the name "example" and was operating an end user device using, e.g., the Mac OS X operating system, the default template "beta" would be selected according to this embodiment because the user does not qualify for any of the conditional statements associated with the templates.

Figure 16:
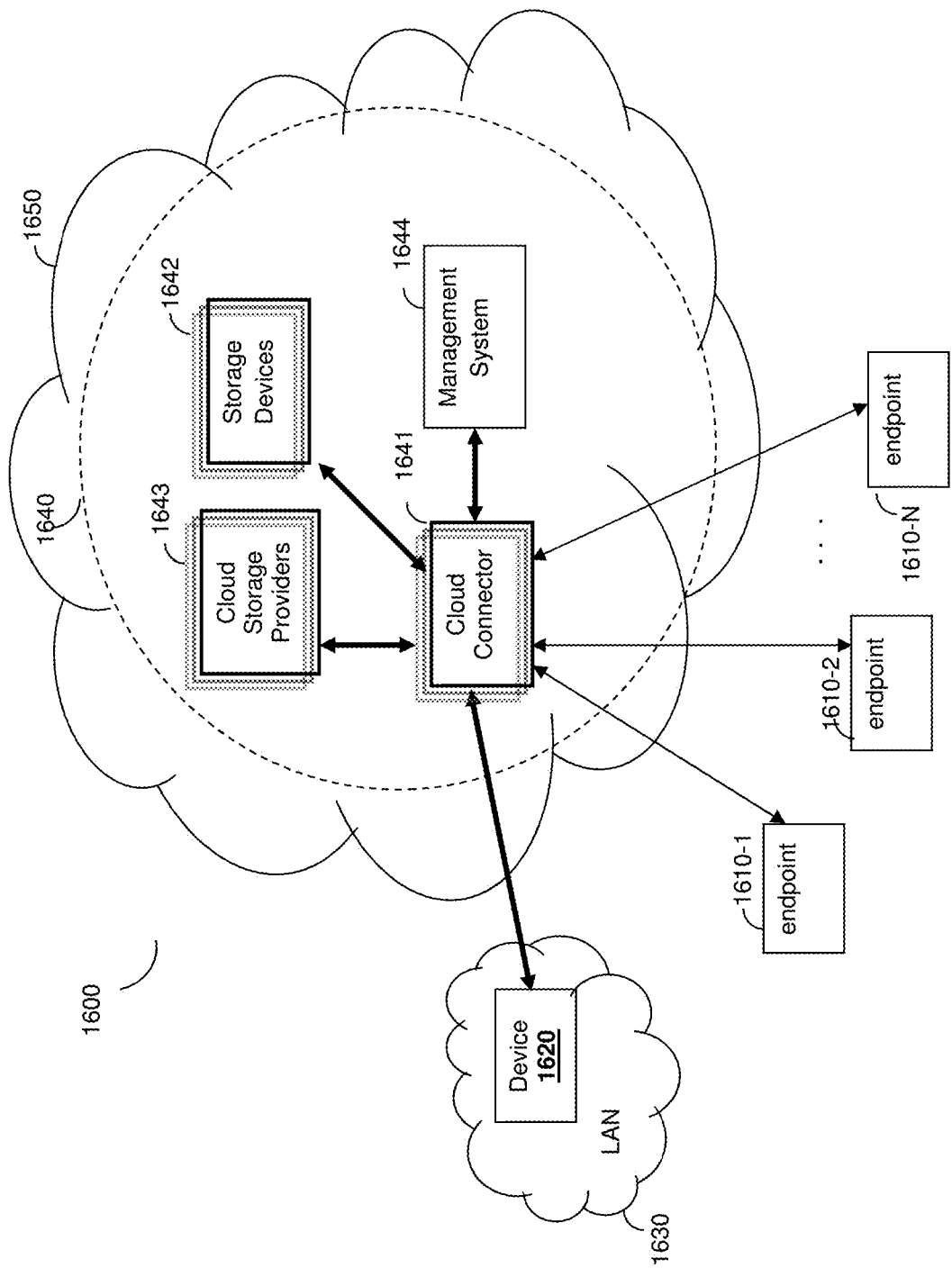
FIG. 16 is a schematic diagram of a system where the disclosed embodiments can be applicable.

FIG. 16 shows an exemplary and non-limiting schematic diagram of a system 1600 in which the disclosed embodiments can be applicable. The system 1600 includes a plurality of endpoints 1610-1 through 1610-N and one or more network attached storage devices 1620 connected to a local area network (LAN) 1630, which may be either a wireless or wired network. The device 1620 is connected to a cloud storage service (CSS) 1640 through the network 1650. The CSS 1640 includes a plurality of cloud connectors 1641 that facilitate connections between the device 1620 and storage devices 1642 (e.g., disk drives and/or SAN/NAS devices), local object storage systems (not shown) such as EMC Atmos or OpenStack, as well as connections to public cloud storage providers 1643 (e.g., Amazon Web Services, IBM SmartCloud, etc.).

The device 1620 is a cloud-enabled storage device that is integrated with cloud storage services. An example of such a device is disclosed in the co-pending patent application Ser. No. 12/641,559, which is assigned to common assignee, and is hereby incorporated by reference for all that it contains. The device 1620 is also an endpoint of the CSS 1640.

The endpoints 1610 may be endpoints executing software agents that can remotely access files stored in the CSS 1640 or in a cloud-enabled storage device 1620, for example using the method described in the co-pending patent application Ser. No. 13/205,238, assigned to common assignee, which is hereby incorporated by reference for all that it contains. A folder in the cloud storage can be accessed by many different users of clients.

In an embodiment, a centralized data flow management system 1644 is incorporated into the CSS 1640. In another embodiment, the centralized data flow management system 1644 is integrated in one more of the cloud connectors 1641.

Figure 17:
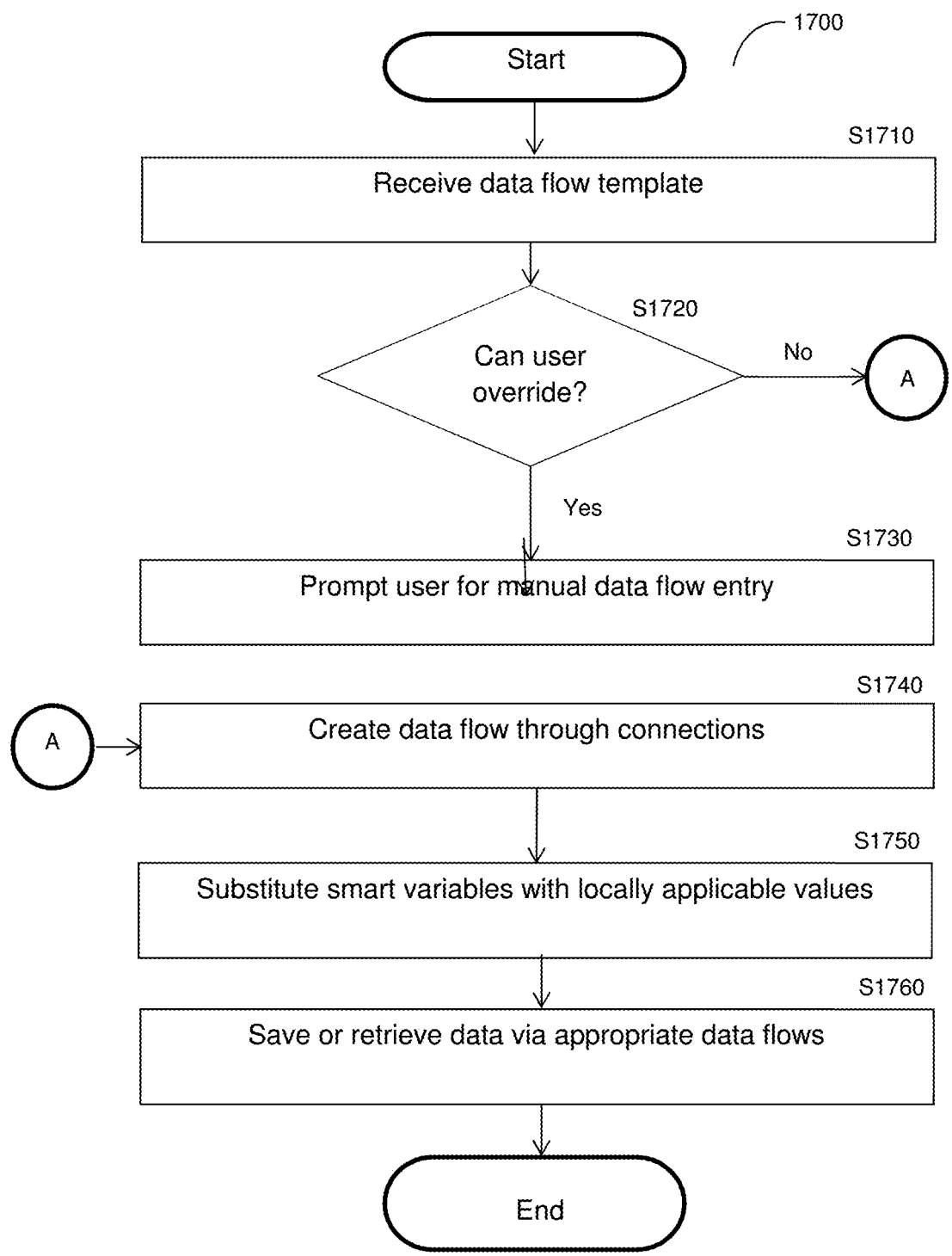
FIG. 17 is an exemplary and non-limiting flowchart illustrating a method for creation and utilization of data flows using data flow templates according to an embodiment.

FIG. 17 is an exemplary and non-limiting flowchart 1700 illustrating a method for creation and utilization of data flows using data flow templates according to an embodiment. At S1710, a data flow template is received from a management system (e.g., the management system 1644). At S1720, it is checked whether the user has satisfied the criteria for overriding the received template. If so, execution continues with S1730; otherwise, execution continues with S1740. In an embodiment, this check may be made based on a determination made by the management system.

At S1730, upon determination that a user may override the selected template, a user is prompted for manual data flow entry. In an embodiment, a user who is permitted to override the template based on the user override policy may nevertheless elect to use the received template. In another embodiment, the user may view the template before deciding whether to manually enter a data flow.

At S1740, upon application of the template(s) or manual data flow entry, a data flow is created via connections between endpoints as defined in each applicable template or entry among all relevant endpoint devices. At S1750, any smart variables associated with the created data flow are substituted with locally applicable values that are relevant to each endpoint device, as appropriate. At S1760, the requested data is saved or retrieved via the established data flow.

As a non-limiting example, a template respective of the first endpoint's metadata may be provided along with a user override policy and a request to save the data to a CSS. Upon determining that the user may not override the provided template, a data flow is created according to the template. Any smart variables are replaced with relevant local variables, and the endpoint saves the data in the CSS via the established data flows.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A distributed storage system for allowing an access to a plurality of cloud storage systems, comprising:
a plurality of cloud storage systems (CSSs); and
a plurality of computing devices, wherein the plurality of computing devices are in close proximity to each other and are geographically remote from each of the plurality of CSSs, wherein at least one of the plurality of computing devices is configured to:
dynamically select a best route between a designated CSS of the plurality of CSSs and the at least one of the plurality of computing devices; and
establish, based on the selected best route, a data flow between the CSS and the at least one of the plurality of computing devices wherein the data flow is established to allow at least a storage service related to the CSS, wherein the storage service enables both storage to the designated CSS and retrieval of data previously stored by the at least one of the plurality of computing devices in the designated CSS;
wherein the best route is one of a direct route between the designated CSS and the at least one of the plurality of computing devices and an indirect route through at least one intermediate one of the plurality of computing devices before the designated CSS;
wherein, from the point of view of the at least one of the plurality of computing devices, the storage related service is deemed complete when the data flow is completed with the designated CSS when a direct route is selected and with the intermediate one of the plurality of computing devices when an indirect route is selected; and
wherein, when an indirect route is selected, the data flow is ultimately completed with the designated CSS.

2. The distributed storage system of claim 1, wherein the at least a storage service is any one of: file synchronization between the CSS and the computing device, caching of files in the CSS, backup of files to the CSS, and remote access to files in the CSS or the computing device.

3. The distributed storage system of claim 1, wherein the best route is any one of: a direct route between the CSS and the computing device, and an indirect route through at least one intermediate computing device.

4. The distributed storage system of claim 1, wherein each computing device is any of: an endpoint, and a cloud storage gateway (CSG).

5. The distributed storage system of claim 1, further comprising:
a regional cache, wherein the regional cache includes at least portions of memory of each of the plurality of computing devices.

6. The distributed storage system of claim 1, wherein the best route is determined based on at least one of: bandwidth, response time, price, data flow type, topological distance, data flow relation type, availability, latency, inclusion in a list of allowable elements, exclusion from a list of allowable elements, and a domain name system (DNS) query resolution.

7. The distributed storage system of claim 1, wherein the data flow is established based on a data flow template defining at least one configurable attribute.

8. The distributed storage system of claim 1, wherein the close proximity is determined based on at least one of: a geographical location, a network topology access delay, bandwidth criteria, cost criteria, and an administrative configuration.

9. The distributed storage system of claim 1, wherein each computing device is configured to provide a selected preferred route between the CSS and the computing device, wherein the preferred route is any of: a direct route between the computing device and the CSS, and an indirect route through any of: an intermediate CSS, and an intermediate computing device.

* * * * *